（12）United States Patent
Cook et al.

(10) Patent No.: US 6,475,711 B1
(45) Date of Patent: Nov. 5, 2002

(54) PHOTOGRAPHIC ELEMENT AND DIGITAL FILM PROCESSING METHOD USING SAME

(75) Inventors: Stacy S. Cook; Albert D. Edgar, both of Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 43 days.

(21) Appl. No.: 09/715,333

(22) Filed: Nov. 17, 2000

Related U.S. Application Data
(60) Provisional application No. 60/174,129, filed on Dec. 31, 1999.

(51) Int. Cl.[7] .............................................. G03C 7/333
(52) U.S. Cl. ..................................................... 430/363
(58) Field of Search ................................. 430/363, 404

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |

(List continued on next page.)

FOREIGN PATENT DOCUMENTS

| | | | |
|---|---|---|---|
| EP | 0 261 782 A2 | 8/1987 | H04N/1/46 |
| EP | 0 422 220 A1 | 3/1989 | A61B/6/03 |
| EP | 0 482 790 B1 | 9/1991 | H04N/1/40 |
| EP | 0 525 886 A3 | 7/1992 | G03D/5/00 |
| EP | 0 580 293 A1 | 1/1993 | H04N/1/04 |

(List continued on next page.)

OTHER PUBLICATIONS

"*Adaptive Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, pp. 546–550, 1994.

(List continued on next page.)

*Primary Examiner*—Hoa Van Le
(74) *Attorney, Agent, or Firm*—Dinsmore & Shohl LLP

(57) ABSTRACT

A photographic element including a light sensitive silver halide emulsion layer having a dye precursor incorporated therein, wherein the dye precursor is capable of forming an infrared dye. A method of developing a latent image on an exposed photographic element is also provided.

14 Claims, 2 Drawing Sheets

U.S. PATENT DOCUMENTS

| | | | | |
|---|---|---|---|---|
| 4,621,037 | A | 11/1986 | Kanda et al. | 430/30 |
| 4,623,236 | A | 11/1986 | Stella | 354/318 |
| 4,633,300 | A | 12/1986 | Sakai | 358/41 |
| 4,636,808 | A | 1/1987 | Herron | 346/75 |
| 4,666,307 | A | 5/1987 | Matsumoto et al. | 356/404 |
| 4,670,779 | A | 6/1987 | Nagano | 358/75 |
| 4,736,221 | A | 4/1988 | Shidara | 354/317 |
| 4,741,621 | A | 5/1988 | Taft et al. | 356/376 |
| 4,745,040 | A | 5/1988 | Levine | 430/21 |
| 4,755,844 | A | 7/1988 | Tsuchiya et al. | 354/317 |
| 4,777,102 | A | 10/1988 | Levine | 430/21 |
| 4,796,061 | A | 1/1989 | Ikeda et al. | 355/73 |
| 4,814,630 | A | 3/1989 | Lim | 250/578 |
| 4,821,114 | A | 4/1989 | Gebhardt | 358/75 |
| 4,845,551 | A | 7/1989 | Matsumoto | 358/80 |
| 4,851,311 | A | 7/1989 | Millis et al. | 430/30 |
| 4,857,430 | A | 8/1989 | Millis et al. | 430/30 |
| 4,875,067 | A | 10/1989 | Kanzaki et al. | 354/325 |
| 4,969,045 | A | 11/1990 | Haruki et al. | 358/228 |
| 4,994,918 | A | 2/1991 | Lingemann | 358/214 |
| 5,027,146 | A | 6/1991 | Manico et al. | 354/299 |
| 5,034,767 | A | 7/1991 | Netz et al. | 354/317 |
| 5,101,286 | A | 3/1992 | Patton | 358/487 |
| 5,124,216 | A | 6/1992 | Giapis et al. | 430/30 |
| 5,155,596 | A | 10/1992 | Kurtz et al. | 358/214 |
| 5,196,285 | A | 3/1993 | Thomson | 430/30 |
| 5,200,817 | A | 4/1993 | Birnbaum | 358/80 |
| 5,212,512 | A | 5/1993 | Shiota | 354/319 |
| 5,231,439 | A | 7/1993 | Takahashi et al. | 354/313 |
| 5,235,352 | A | 8/1993 | Pies et al. | 346/140 |
| 5,255,408 | A | 10/1993 | Blackman | 15/308 |
| 5,266,805 | A | 11/1993 | Edgar | 250/330 |
| 5,267,030 | A | 11/1993 | Giorgianni et al. | 358/527 |
| 5,292,605 | A | 3/1994 | Thomson | 430/30 |
| 5,296,923 | A | 3/1994 | Hung | 358/527 |
| 5,334,247 | A | 8/1994 | Columbus et al. | 118/411 |
| 5,350,651 | A | 9/1994 | Evans et al. | 430/21 |
| 5,350,664 | A | 9/1994 | Simons | 430/362 |
| 5,357,307 | A | 10/1994 | Glanville et al. | 354/324 |
| 5,360,701 | A | 11/1994 | Elton et al. | 430/501 |
| 5,371,542 | A | 12/1994 | Pauli et al. | 348/262 |
| 5,391,443 | A | 2/1995 | Simons et al. | 430/21 |
| 5,414,779 | A | 5/1995 | Mitch | 382/199 |
| 5,416,550 | A | 5/1995 | Skye et al. | 354/298 |
| 5,418,119 | A | 5/1995 | Simons | 430/507 |
| 5,418,597 | A | 5/1995 | Lahcanski et al. | 355/76 |
| 5,432,579 | A | 7/1995 | Tokuda | 354/293 |
| 5,436,738 | A | 7/1995 | Manico | 358/503 |
| 5,440,365 | A | 8/1995 | Gates et al. | 354/298 |
| 5,447,811 | A | 9/1995 | Buhr et al. | 430/20 |
| 5,448,380 | A | 9/1995 | Park | 358/520 |
| 5,452,018 | A | 9/1995 | Capitant et al. | 348/651 |
| 5,465,155 | A | 11/1995 | Edgar | 358/500 |
| 5,477,345 | A | 12/1995 | Tse | 358/500 |
| 5,496,669 | A | 3/1996 | Pforr et al. | 430/22 |
| 5,516,608 | A | 5/1996 | Hobbs et al. | 430/30 |
| 5,519,510 | A | 5/1996 | Edgar | 358/471 |
| 5,546,477 | A | 8/1996 | Knowles et al. | 382/242 |
| 5,550,566 | A | 8/1996 | Hodgson et al. | 345/202 |
| 5,552,904 | A | 9/1996 | Ryoo et al. | 358/518 |
| 5,563,717 | A | 10/1996 | Koeng et al. | 358/406 |
| 5,568,270 | A | 10/1996 | Endo | 358/298 |
| 5,576,836 | A | 11/1996 | Sano et al. | 358/302 |
| 5,581,376 | A | 12/1996 | Harrington | 358/518 |
| 5,587,752 | A | 12/1996 | Petruchik | 396/315 |
| 5,596,415 | A | 1/1997 | Cosgrove et al. | 358/296 |
| 5,627,016 | A | 5/1997 | Manico | 430/434 |
| 5,649,260 | A | 7/1997 | Wheeler et al. | 396/569 |
| 5,664,253 | A | 9/1997 | Mevers | 396/603 |
| 5,664,255 | A | 9/1997 | Wen | 396/627 |
| 5,667,944 | A | 9/1997 | Reem et al. | 430/359 |
| 5,678,116 | A | 10/1997 | Sugimoto et al. | 396/611 |
| 5,691,118 | A | 11/1997 | Haye | 430/357 |
| 5,695,914 | A | 12/1997 | Simon et al. | 430/379 |
| 5,698,382 | A | 12/1997 | Nakahanada et al. | 430/418 |
| 5,726,773 | A | 3/1998 | Mehlo et al. | 358/474 |
| 5,739,897 | A | 4/1998 | Frick et al. | 355/40 |
| 5,771,107 | A | 6/1998 | Fujimoto et al. | 358/464 |
| 5,790,277 | A | 8/1998 | Edgar | 358/487 |
| 5,835,795 | A | 11/1998 | Craig et al. | 396/6 |
| 5,835,811 | A | 11/1998 | Tsumura | 396/598 |
| 5,870,172 | A | 2/1999 | Blume | 355/27 |
| 5,880,819 | A | 3/1999 | Tanaka et al. | 355/75 |
| 5,892,595 | A | 4/1999 | Yamakawa et al. | 358/530 |
| 5,930,388 | A | 7/1999 | Murakami et al. | 382/167 |
| 5,959,720 | A | 9/1999 | Kwon et al. | 355/38 |
| 5,963,662 | A | 10/1999 | Vachtsevanos et al. | 382/150 |
| 5,966,465 | A | 10/1999 | Keith et al. | 382/232 |
| 5,979,011 | A | 11/1999 | Miyawaki et al. | 15/308 |
| 5,982,936 | A | 11/1999 | Tucker et al. | 382/233 |
| 5,982,937 | A | 11/1999 | Accad | 382/239 |
| 5,982,941 | A | 11/1999 | Loveridge et al. | 382/260 |
| 5,982,951 | A | 11/1999 | Katayama et al. | 382/284 |
| 5,988,896 | A | 11/1999 | Edgar | 396/604 |
| 5,991,444 | A | 11/1999 | Burt et al. | 382/232 |
| 5,998,109 | A | 12/1999 | Hirabayashi | 430/434 |
| 6,000,284 | A | 12/1999 | Shin et al. | 73/150 |
| 6,005,987 | A | 12/1999 | Nakamura et al. | 382/294 |
| 6,065,824 | A | 5/2000 | Bullock et al. | 347/19 |
| 6,069,714 | A | 5/2000 | Edgar | 358/487 |
| 6,088,084 | A | 7/2000 | Nishio | 355/75 |
| 6,089,687 | A | 7/2000 | Helterline | 347/7 |
| 6,101,273 | A | 8/2000 | Matama | 382/169 |
| 6,102,508 | A | 8/2000 | Cowger | 347/7 |
| 6,137,965 | A | 10/2000 | Burgeios et al. | 396/626 |
| 6,174,654 | B1 * | 1/2001 | Hagiwara et al. | 430/493 |
| 6,200,738 | B1 | 3/2001 | Takano et al. | 430/362 |

FOREIGN PATENT DOCUMENTS

| | | | |
|---|---|---|---|
| EP | 0 601 364 A1 | 6/1994 | H04N/1/387 |
| EP | 0 669 753 A2 | 2/1995 | H04N/1/407 |
| EP | 0 794 454 A2 | 2/1997 | G03B/27/73 |
| EP | 0 768 571 A2 | 4/1997 | G03D/13/00 |
| EP | 0 806 861 A1 | 11/1997 | H04N/1/00 |
| EP | 0 878 777 A2 | 11/1998 | G06T/5/40 |
| EP | 0 930 498 A2 | 12/1998 | G01N/21/88 |
| WO | WO 90/01240 | 2/1990 | H04N/1/40 |
| WO | WO 91/09493 | 6/1991 | H04N/5/217 |
| WO | WO 97/25652 | 7/1997 | G03D/5/00 |
| WO | WO 98/19216 | 5/1998 | G03C/5/29 |
| WO | WO 98/25399 | 6/1998 | H04N/1/38 |
| WO | WO 98/31142 | 7/1998 | H04N/5/253 |
| WO | WO 93/34157 | 8/1998 | |
| WO | WO 98/34157 | 8/1998 | |
| WO | WO 98/34397 | 8/1998 | |
| WO | WO 99/43148 | 8/1999 | H04N/1/00 |
| WO | WO 99/43149 | 8/1999 | H04N/1/100 |
| WO | WO 01/01197 | 1/2001 | G03D/5/00 |
| WO | WO 01/13174 A1 | 2/2001 | G03D/5/06 |
| WO | WO 01/45042 A1 | 6/2001 | G06T/5/00 |
| WO | WO 01/50192 A1 | 7/2001 | G03C/7/407 |
| WO | WO 01/50193 A1 | 7/2001 | G03C/7/407 |
| WO | WO 01/50194 A1 | 7/2001 | G03C/7/407 |
| WO | WO 01/50197 A1 | 7/2001 | G03C/7/42 |
| WO | WO 01/52556 A2 | 7/2001 | H04N/9/11 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Photorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

PHOTOGRAPHIC ELEMENT AND DIGITAL FILM PROCESSING METHOD USING SAME

This application claims the benefit of provisional application No. 60/174,129 filed on Dec. 31, 1999.

BACKGROUND OF THE INVENTION

1. Field of the Invention

The present invention relates to a photographic element as well as a digital film processing method. More particularly, the present invention provides a photographic element having at least one dye precursor capable of forming a dye which absorbs infrared light, as well as a digital film processing method wherein a dye is formed in the photographic element during processing.

2. Description of Related Art

In traditional film photography, the photographic film includes one or more layers of a photosensitive material (typically silver halide). When a picture is taken, the light from the scene interacts with the film's photosensitive material to produce a chemical change in the photosensitive material. This chemical change is in direct proportion to the intensity of the light. The greater the intensity of light from the scene, the greater the chemical change in the photosensitive material. As described in greater detail below, the photographic film is then chemically developed in order to produce an image based on the chemical change.

Conventional black and white photographic film generally has a single layer of silver halide emulsion coated on a transparent film support. Color photographic film generally includes multiple layers of silver halide in combination with dye forming coupling agents. Each silver halide layer in color photographic film is sensitive to a different portion of the visible spectrum. Typically, color film includes one or more silver halide layers sensitized to each of blue, green and red portions of the visible spectrum, and the coupler in each layer is capable of forming a dye of a color which is complimentary to the color of light to which the layer is sensitized. For example, a silver halide layer which is sensitized to blue light will include a coupler associated with the formation of a yellow dye.

In traditional chemical development processes, the exposed film is developed using a developing agent. The developing agent chemically reduces the exposed silver halide to elemental silver. The amount of elemental silver produced in any given area of the film corresponds to the intensity of light which exposed that area. Those areas of the silver halide where the light intensity was the greatest will have the greatest amount of elemental silver produced. In contrast, in those areas of the silver halide where the light intensity was low, a very small amount of elemental silver is produced. The pattern of elemental silver thus forms an image in the silver halide layers.

During the traditional chemical development process, the highlight areas of the image (e.g., areas of the film which were exposed to the greatest intensity of light) will develop before those areas of the film which were exposed to a lower intensity of light (such as areas of the film corresponding to shadows in the original scene). A longer development time allows shadows and other areas of the film which were exposed to a low intensity of light to be more fully developed, thereby providing more detail in these areas. However, a longer development time will also reduce details and other features in the highlight areas of the image. Thus, the development time in a traditional chemical development process is typically chosen as a compromise between highlight details, shadow details and other features of the image which are dependant upon the duration of development. After development, in the case of black and white photographic film, the image is fixed by dissolving the undeveloped silver halide. The developed negative can then be used to produce a corresponding positive image on photographic paper by methods well known to those skilled in the art.

In the case of conventional color photographic film development, elemental silver is formed in the silver halide layers as described above. After the developing agent has reduced the exposed silver halide to elemental silver, the oxidized developing agent reacts with the couplers in the film to produce dye clouds around the grains of elemental silver in each of the layers. The color of the dye clouds in each layer of the film is complementary to the color of light the layer has been sensitized to. For example, the red sensitive layer typically produces cyan dye clouds, the green layer produces magenta dye clouds, and the blue layer produces yellow dye clouds. At this point, each layer of the color film includes both a silver image and a dye cloud image. The elemental silver and undeveloped silver halide are then removed from the film by bleaching and fixing, leaving only a dye image in each layer of the film. Since the dye in each emulsion layer is formed in an imagewise manner, the developed film will generally have yellow, magenta and cyan colored negative: images in the blue, green, and red-sensitive emulsion layers, respectively. The color negative can then be used to produce a corresponding positive image on photographic paper by methods known to those skilled in the art.

The negative, or the corresponding positive image, can also be digitized using a conventional electronic scanner to produce a digital representation of the image. Scanning of negative images on film is typically accomplished by passing visible light through the developed negative. Light transmitted through the film is attenuated by developed silver (black and white film) or by the dye layers (color film), thereby allowing one to capture and record a digital representation of the image. The transmitted light is then passed through filters having appropriate spectral sensitivities such that the densities of the yellow, magenta and cyan dyes may be detected for each location on the film. The density values detected in this way are indirect measures of the blue, green and red light that initially exposed each location on the film These measured density values constitute three values used as the blue, green and red values for each corresponding location, or pixel, in the digital image. Further processing of these pixel values is often performed to produce a digital image that accurately reproduces the original scene and is pleasing to the human eye.

A relatively new process for developing film is digital film processing ("DFP"). Digital film processing digitizes, i.e., electronically scans, the silver image during the development process. The elemental silver image developed in each of the layers of the photographic film is used to construct a digital image of the scene photographed. The developing film is scanned with infrared ("IR") light so that the scanning light will not fog the film. The image can be scanned at different times during the development process in order to acquire additional information from the photographic film. The digitized images are then electronically processed to determine the colors associated with each location. The resulting digital image can then be printed or manipulated, as desired.

As discussed previously, conventional color negative film includes dye precursors (specifically, couplers) in the light sensitive silver halide emulsion layers, and these couplers react with oxidized developing agent to form dyes in an imagewise manner. However, at least three different couplers must be used in at least three different emulsion layers of the film in order to allow for the formation of differently hued images which correspond to the different spectral sensitivities of each emulsion layer. For example, the emulsion layer(s) sensitized to blue light include a coupler which forms a yellow dye during development, while the emulsion layer(s) sensitized to green light include a coupler which forms a magenta dye. The dyes formed upon development of conventional color negative film do not attenuate IR light. Therefore, when conventional color negative film is subjected to DFP using IR light, the dyes formed during development will not attenuate the IR light used during scanning. Only the developed silver in the emulsion layers will attenuate the IR scanning light.

SUMMARY OF THE INVENTION

The present invention provides a photographic element comprising a light sensitive silver halide emulsion layer having a dye precursor incorporated therein, the dye precursor capable of forming an infrared dye. The dye precursor may comprise an infrared dye-forming coupler.

The photographic element may include at least three silver halide emulsion layers, one responsive to the blue region of the spectrum, one responsive to the green region of the spectrum, and one responsive to the red region of the spectrum, wherein the coupler is incorporated in the green responsive layer. The dye precursor may even be incorporated into each of the layers. The same dye precursor is incorporated in each: of the layers, or a different dye precursor may be incorporated into each of the layers.

A method of developing a latent image on an exposed photographic element is also provided, and comprises: providing a photographic element comprising a light sensitive silver halide emulsion layer having a dye precursor incorporated therein; applying a developer solution to the photographic element, thereby developing the latent image and forming the dye in the photographic element; and scanning the photographic element with light while the latent image is developing, the light having a wavelength which is attenuated by the dye. The dye precursor may comprise a coupler, the developer solution may comprise a developing agent. The developing agent is oxidized upon development of the latent image, and the dye is imagewise formed in the photographic element by a reaction between the coupler and the oxidized developing agent. Suitable developing agents include aromatic primary amines.

DETAILED DESCRIPTION OF THE PREFERRED EMBODIMENTS

The present invention provides a photographic element having at least one dye precursor capable of forming a dye which absorbs infrared light, as well as a digital film processing method wherein a dye is formed in the photographic element during processing. A dye precursor (such as a coupler) is associated with one or more of the light sensitive layers of the film. The dye precursor is chosen such that it will imagewise form a dye which attenuates electromagnetic radiation of the wavelength used in a DFP method (preferably infrared light). The photographic element may include a plurality of light sensitive layers, and a dye precursor may be associated with more than one of these light sensitive layers. The same dye precursor may be incorporated into more than one light sensitive layer. Alternatively, different dye precursors may be provided in each of the light sensitive layers, wherein each forms a dye which absorbs scanning light of a different wavelength.

The dye(s) formed during DFP will provide an increased signal range during scanning without a corresponding increase in noise. In addition, the spectral properties of the dye (e.g., the dyes absorption of particular wavelengths of scanning light) may be used to distinguish the light sensitive layers from one another during scanning, particularly when a unique dye is formed in each of the layers.

Figure 1:
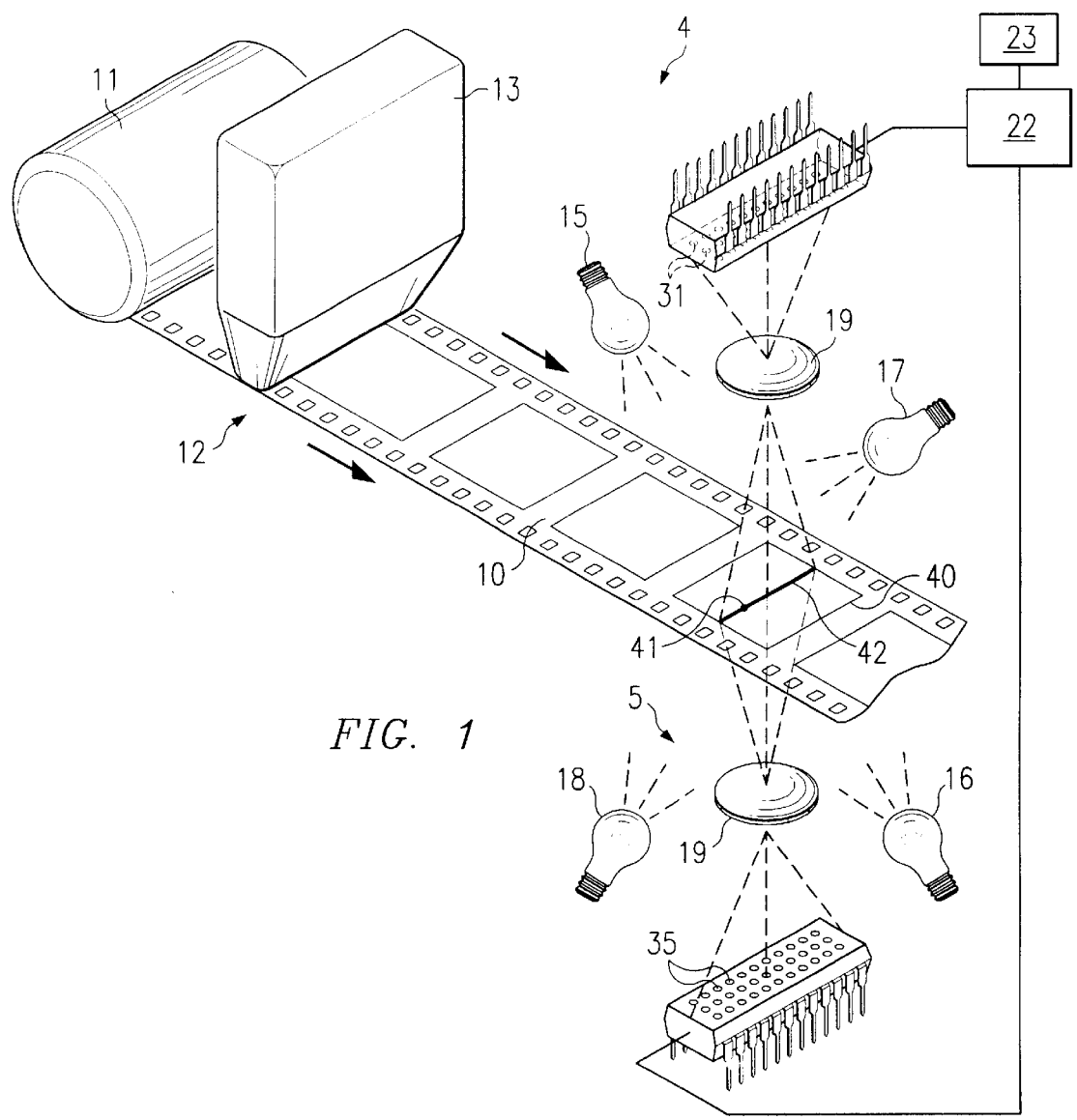
FIG. 1 is a schematic illustration of a digital film processing system which may be used in a DFP method according to one embodiment of the present invention.

FIG. 1 is a schematic representation of a digital film processing ("DFP") system 4 which may be used in the methods of the present invention. DFP system 4 may in turn be part of a larger optical and electronic system. DFP system 4 includes a scanning apparatus 5 and a developer supply station 12. Scanning apparatus 5 operates by converting electromagnetic radiation attenuated by an image into an electronic (digital) representation of the image. The image being scanned is typically embodied in a physical form, such as on a photographic media (e.g., film 10 in cartridge 11), although other media may be used. In many applications, the electromagnetic radiation used to convert the image into a digitized representation is infrared light; however, visible light and other suitable types of electromagnetic radiation may also be used to produce the digitized image.

DFP system 4 may be employed to electronically process an exposed photographic element, such as film 10 in cartridge 11. As described in further detail below, film 10 includes one or more light sensitive silver halide emulsion layers. At least one of these layers has a dye precursor associated therewith, wherein the dye precursor imagewise forms a dye during development. By way of example, film 10 can comprise color negative film, or even color positive or reversal film. Color negative film generally has at least three silver halide emulsion layers, with at least one layer sensitized to each of blue, green and red light. Couplers are typically included in each of the light sensitive emulsion layers of conventional color negative film. However, the couplers incorporated into conventional color negative film form dyes which generally do not attenuate (i.e., absorb) infrared ("IR") light. Thus, the photographic element provided by one embodiment of the present invention includes one or more dye precursors (e.g., couplers) which, upon development, form dyes which absorb infrared light.

Film 10 may be provided in a variety of forms, such as a sheet or strip. In the embodiment of FIG. 1, film 10 comprises a strip which may be housed in a cartridge 11 which is configured for use in a conventional camera (such as a 35 mm camera). After imagewise exposure, film 10 is subjected to digital film processing in accordance with the methods of the present invention. Film 10 is advanced from cartridge 11 through a developer supply station 12, whereat a developer solution is applied to film 10. Developer solution may be applied at station 12 by any of a variety of means. For example, developer solution may be applied from a pod as a viscous fluid under a clear cover film, as described in U.S. Pat. No. 5,465,155 ("the '155 patent", which is incorporated herein by way of reference). Alternatively, the developer solution may be applied using the apparatus and methods described in U.S. Pat. No. 5,988,896. In the embodiment shown in FIG. 1, the developer solution is applied as a viscous fluid from slot coater 13 having an elongate slot positioned above, and extending across the width of, film 10. The developer solution is forced through the elongate slot of slot coater 13 onto film 10.

The developer solution may comprise a developing agent capable of converting the exposed silver halide in each light sensitive layer of film 10 to elemental silver. Thus, developing agents used in conventional film developing may be employed. In fact, a C-41 developer solution may be used in the present invention. The developer solution may be aqueous, and may be maintained at an alkaline pH. In addition to the developing agent, the developer solution can include various other additives well-known to those skilled in the art. Suitable additives include, for example, various preservatives (e.g., sodium sulfite, sodium bisulfite, sodium metabisulfate or potassium metabisulfate), accelerators (e.g., potassium or sodium carbonate, potassium or sodium hydroxide, borax, or sodium metaborate), restrainers (such as potassium bromide), and antifoggants (such as benzotriazole or 6-nitrobenzimidazole nitrate).

At a predetermined time after application of the developer solution, film 10 is scanned using scanning apparatus 5 of FIG. 1, preferably using light in the infrared region in order to avoid fogging the developing film. Film 10 is subjected to a reflectance scan from each side ("front" and "back" scans) and at least one transmission scan ("through" scan). At least two sources of electromagnetic radiation are generally provided in scanning apparatus 5, such as first light source 15 and second light source 16, and these light sources illuminate film 10 containing a scene image 40 from opposite sides of film 10 (i.e., from above and below film 10). First source 15 and second source 16 may apply electromagnetic radiation of the same or different wavelengths to film 10. In addition, when first and second sources 15 and 16 apply radiation of the same wavelength, that wavelength may be a discrete spectral wavelength or a band of wavelengths (such as broadband IR light). Radiation from sources 15 and 16 may be diffused or directed by additional optics such as filters and/or one or more lenses (not shown).

As further described below, when first source 15 and second source 16 apply electromagnetic radiation of different wavelengths to film 10 (such as infrared light of two different wavelengths), the optical sensors of DFP system 4 are configured to distinguish between these different wavelengths. Thus, in such an embodiment, first source 15 emits radiation of a first wavelength (such as a spectral wavelength or a band of wavelengths), and second source 16 emits radiation of a second wavelength which is different from the first wavelength. First and second light sources 15 and 16 may be individually configured to generate light of the desired wavelength (either as a single spectral wavelength or as a band of wavelengths). Alternatively, each light source may emit a broadband of light, and suitable filters (e.g., bandpass filters) or other wavelength limiting devices may be associated with each light source to ensure that the photographic element is scanned with the desired wavelengths of light.

The radiation from sources 15 and 16 is attenuated by the elemental silver and dye at each spot on the film. The attenuated radiation is detected and converted to digital signals using appropriate optical and electronic systems, as further described below. Based on the amount of detected radiation, one embodiment of the present invention produces three values, referred to as front, back, and through data, for each pixel on the film. These values are directly related to the elemental silver and dye that forms the image in each layer of the film.

The above-described scans may be repeated at one or more additional predetermined times after application of the developer solution. For example, image data may be acquired at short, normal and long development times. Scanning may be performed at any number of predetermined times after application of the developer solution. In contrast, conventional film development allows only a single development time, and therefore compromises must be made between, for example, shadow and highlight detail.

Scanning apparatus 5 of FIG. 1 also includes a number of optical sensor elements 31 and 35. The optical sensors measure the intensity of electromagnetic radiation passing through or reflected by film 10. Each sensor element generally comprises a photodetector (not expressly shown) that produces an electrical signal proportional to the intensity of electromagnetic energy striking the photodetector. Accordingly, the photodetector measures the intensity of electromagnetic radiation attenuated by image 40 on film 10. Optical sensor elements 31 and 35 are configured to be responsive to radiation of the wavelength used for scanning.

Any of a variety of light responsive sensor elements may be employed (i.e., any sensor which can generate an electrical signal in response to light). Suitable sensors include phototransistors, photoresistors, charge coupled devices (CCD's), time delay integration arrays ("TDI" arrays), or any other device capable of responding to light. It should be pointed out that the term CCD is typically used generically in the art to refer to a semiconductor sensor array. The sensor may include one or more individual sensor elements, each of which is light responsive. A CCD sensor, for example, will include a one or more individual photosensitive elements, such that each sensor element of the CCD acquires image data corresponding to a discrete, typically very small, region of the image being scanned. A plurality of individual sensor elements may be arranged in an array to allow for the scanning of an entire area of an image at one time. Alternatively, a plurality of individual sensor elements may be arranged in one or more rows such that the CCD sensor will acquire image data on a line by line (rather than area) basis. Thus, in the embodiment of FIG. 1, sensors 31 and 35 are each arranged in a trilinear array. In fact, when a single wavelength of IR light is used for scanning, conventional trilinear CCD arrays may be used, since these sensor arrays are responsive to IR light.

The optical sensors are typically housed in a circuit package which is electrically connected (e.g., by a cable) to supporting electronics for computer data storage and processing, shown together as computer 22. Computer 22 can then process the data provided by the optical sensors in order to generate a digitized image. It should be noted that computer 22 need not be separate from the other apparatus used in the methods of the present invention, since a microprocessor may be incorporated into a single apparatus which also includes the scanning stations, and the developer supply station.

In the specific embodiment shown in FIG. 1, light source 15 may be positioned on the side of film 10 opposite optical sensors 35, while light source 16 may be positioned on the side of film 10 opposite optical sensors 31. Radiation emitted from first source 15 will pass through image 40 on film 10 toward sensors 35, while radiation emitted from second source 16 will pass through image 40 on film 10 toward sensors 31. In addition, radiation emitted from first source 15 will also be reflected from image 40 toward sensors 31, and radiation emitted from second source 16 will similarly be reflected from image 40 toward sensors 35.

When first source 15 is activated, sensors 31 will detect radiation of the reflected by image 40 ("front" data), while sensors 35 will detect radiation which passes through image 40 ("through" data; more specifically "back-through" data). Similarly, when second source 16 is activated, sensors 35 will detect radiation reflected by image 40 ("back" data), while sensors 31 will detect radiation of the second wavelength which passes through image 40 ("front-through" data). This process of using two sources positioned on opposite sides of the film being scanned is described in more detail below in conjunction with FIG. 2. It should be pointed out that only a single through scan may be needed (either back-through or front-through). Also, one or more additional light sources may be provided, such as third and fourth light sources 17 and 18, respectively.

Scanning apparatus 5 may also include one or more lenses 19 positioned between film 40 and each of the optical sensors in order to direct and focus the radiation on the sensors. The optical sensors 31 and 35 are generally geometrically positioned in arrays such that the electromagnetic energy striking each optical sensor corresponds to a distinct location 41 in image 40. Accordingly, each distinct location 41 in the scene image 40 corresponds to a distinct location, referred to as a picture element, or "pixel" for short, in the scanned, or digitized image provided by the scanning system.

As noted in FIG. 1, each set of sensors (e.g., the set comprising sensors 31) may be arranged in a linear array, such that each set of sensors projects back through lens 19 as a line 42 extending vertically across image 40. By scanning across the width of image 40 of film 10 (such as by advancing film 10 in the direction shown by the arrows), each point on image 40 will be scanned with radiation from first and second sources 15 and 16. In order to scan the entire width of image 40, film 10 must be moved perpendicularly to projection line 42, as shown. In this manner, image data will be acquired by the optical sensors on a line by line basis. Alternatively, film 10 may remain stationary and the optical sensors, lenses 19 and/or light sources 15 and 16 may be moved in order to scan across the width of image 40. Of course other types of sensors may negate the need to advance film 10 in order to scan the entirety of image 40 (such as CCD area sensors), or may necessitate other scanning patterns.

Figure 2:
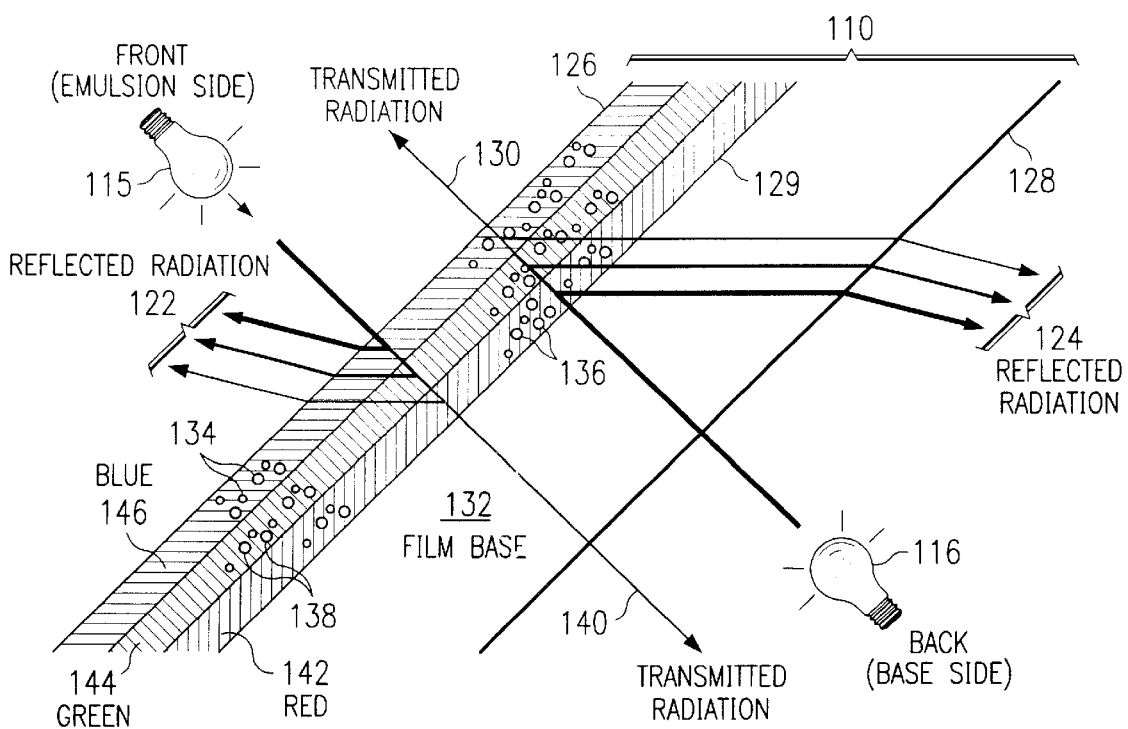
FIG. 2 is a schematic illustration of a photographic element and a digital film processing method in accordance with one embodiment of the present invention.

FIG. 2 schematically depicts a photographic element comprising film 110 according to one embodiment of the present invention, as well as a DFP method applied to film 110. Film 110 generally comprises a support layer 132 (such as a clear film base), and a plurality of light sensitive silver halide emulsion layers. In the embodiment of FIG. 2, three light sensitive layers are provided: red-sensitive silver halide emulsion layer 142; green-sensitive silver halide emulsion layer 144; and blue-sensitive silver halide emulsion layer 146. These layers are not physically the colors; rather, they are sensitive to these colors. Thus, when film 110 is exposed to a scene image, the light from the scene will interact with these light sensitive layers to produce a chemical change in the silver halide in the manner well-known to those skilled in the art. Film 110 can include additional layers (not expressly shown) of the type employed in conventional photographic films.

At least one of the silver halide emulsion layers also has a dye precursor (such as a coupler) incorporated therein. Unlike the couplers employed in conventional color negative film, this dye precursor will form a dye which absorbs radiation of the wavelength used for scanning in a DFP process (such as IR light).

The dye precursor is also chosen such that it will form a dye in the emulsion layer of the film in an imagewise fashion. The dye precursor may comprise a coupler of a type which will react with oxidized developing agent to form the desired dye in the emulsion layers of the film. Thus, when a developer solution is applied to film 10, the developing agent will reduce the developable silver halide (i.e., the exposed silver halide) to elemental silver. The oxidized developing agent will then react with the coupler to produce dye clouds around the grains of elemental silver in the light sensitive layer in which the coupler is present. In this manner, the light senstive layer having a coupler incorporated therein will be developed such that it includes both a silver image and a dye cloud image.

Suitable developing agents which, when oxidized, will react with a coupler to form a dye include aromatic primary amines. Exemplary developing agents which may be used in the present invention include various phenylenediamines (including salts thereof) well-known to those skilled in the art. Exemplary developing agents include:

4-Amino-3-methyl-N-ethyl-N-($\beta$-hydroxyethyl)-aniline sulfate;

2-Amino-5-diethylaminotoluene Monohydrochloride; and

4-Amino-3-methyl-N-ethyl-N-($\beta$-methanesulfonamidoethyl)-m-toluidine sesquisulfate monohydrate.

The above developing agents are commonly used in the C-41 process for developing conventional color negative film. In fact, a C-41 developer solution may be used in the present invention. The developer solution may be aqueous, and may be maintained at an alkaline pH. In addition to the developing agent, the developer solution can include various other additives well-known to those skilled in the art. Suitable additives include, for example, various preservatives (e.g., sodium sulfite, sodium bisulfite, sodium metabisulfate or potassium metabisulfate), accelerators (e.g., potassium or sodium carbonate, potassium or sodium hydroxide, borax, or sodium metaborate), restrainers (such as potassium bromide), and antifoggants (such as benzotriazole or 6-nitrobenzimidazole nitrate).

Since the developed silver in each emulsion layer is not bleached out, the silver will attenuate the illumination light in the same manner as in, for example, the '155 patent. The present invention, however, employs a dye precursor which forms a dye in an emulsion layer of the film which also attenuates the electromagnetic radiation used during scanning (e.g., forms a dye which attenuates IR light). Since the combination of elemental silver and the dye will attenuate more light than the silver alone, the present invention provides an increased signal range between the low and high light exposure regions of the image for any the emulsion layer in which the dye precursor was incorporated. For example, little (if any) dye or silver will form in the unexposed regions of a negative film, while the more highly exposed areas of the film (e.g., the highlight regions of the negative) will have the most dye and silver formation. The attenuation of the illumination light will not be affected in the unexposed areas of the image where no dye has formed, while significantly greater attenuation will occur in the highlight areas. At the same time, the noise level (due to, for example, film graininess and noise caused by the electronics of the DFP system itself will remain substantially the same.

The dye precursors which may be used in the present invention comprise couplers which are capable of forming dyes which absorb (attenuate) light of the wavelength used for scanning. Thus, when IR light is used for scanning, the dye formed during processing should be of a type which absorbs light in the IR spectrum. The couplers used in conventional color negative film do not form. dyes which absorb IR light. Suitable couplers include:

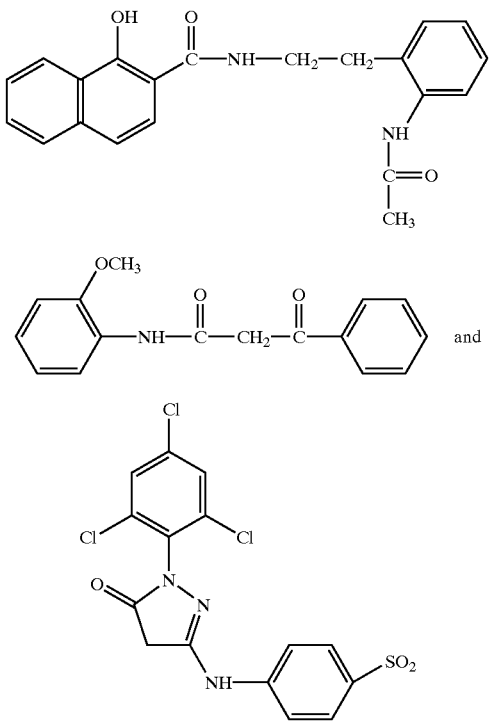

Ballast groups may also be incorporated into the coupler in order to facilitate preparation of the film.

As previously described, the present invention uses duplex film scanning which refers to using a first (or front) source 115 and a second (or back) source 116 to scan film 110 with radiation (such as IR light). Front source 115 applies radiation towards front surface 126 of film 110, and a portion of this radiation is reflected away from front surface 126 (reflected radiation 122) and a portion is transmitted through film 110 (transmitted radiation 140). Back source 116 applies radiation towards back surface 128 of film 110, and a portion of this radiation is reflected away from back emulsion surface 129 (reflected radiation 124) and a portion is transmitted through film 110 (transmitted radiation 130).

In FIG. 2, the separate color-sensitive layers are viewable within the film 110 during development of the red-sensitive layer 142, green-sensitive layer 144 and blue-sensitive layer 146. During development, layers 142,144, and 146 are opalescent. Dark silver grains 134 developing in the top layer 146, the blue sensitive layer, are visible from the front 126 of the film, and slightly visible from the back 128 because of the bulk of the opalescent emulsion. Similarly, silver grains 136 in the bottom layer 142, the red sensitive layer, are visible from the back 128 by reflected radiation 124, but are much less visible from the front 126. Silver grains 138 in the middle layer 144, the green sensitive layer, are only slightly visible by reflected radiation 122 and 124. However, they are visible along with those in the other layers by transmitted radiation 130 and 140. If the dye precursor is incorporated into green-sensitive layer 144, the dye clouds formed in layer 144 during development will also be visible by transmitted radiation 130 and 140. By sensing radiation reflected away from front 126 and back 129 as well as radiation transmitted through the film 110, each pixel for the film 110 yields three measured values, one from each scan, that may be mathematically processed in a variety of ways to produce the initial three colors, red, green and blue, closest to the original scene.

The front signal records the radiation 122 reflected from the first illumination source 115 in front of the film 110. The set of front signals for an image is called the front channel. The front channel principally, but not entirely, records the attenuation in the radiation from the first source 115 due to the silver metal particles 134 in the top-most layer 146, which is the blue recording layer. There is also some attenuation of the front channel due to silver metal particles 136 and 138 in the red and green layers 142 and 144, respectively, as well as the dye clouds in layer 144 (not expressly shown in FIG. 2).

The back signal records the radiation 124 reflected from the second illumination source 116 in back of the film 110. The set of back signals for an image is called the back channel. The back channel principally, but not entirely, records the attenuation in the radiation from the second source 116 due to the silver metal particles 136 in the bottom-most layer 142, which is the red recording layer. Additionally, there is some attenuation of the back channel due to silver metal particles 134 and 138 in the blue and green layers 146 and 144, respectively, as well as the dye clouds in layer 144.

The front-through signal records the radiation 130 that is transmitted through the film 110 from the second illumination source 116 in back of the film 110. The set of front-through signals for an image is called the front-through channel. If desired, the back-through signal records the radiation 140 that is transmitted through the film 110 from the first source 115 in front of the film 110. The set of back-through signals for an image is called the back-through channel. Both through channels record essentially the same image information since they both record the attenuation of the radiation 130, 140 due to the silver metal particles 134, 136, 138 in all three red, green, and blue recording layers 142, 144, 146 of the film 110, as well the dye clouds in layer 144. Thus, if dye clouds are formed in green-sensitive layer 144, the dye clouds will boost the signal to noise ratio for the "green portion" of the front-through signal.

The same dye precursor may also be incorporated into any number of the light-sensitive layers of film 110 (including all of the light-sensitive layers). In this manner, the signal to noise ratio can be increased for all of the channels, since the scanning light will be attenuated by both silver and dye in each of the layers of the film.

Several image processing steps are required to convert the illumination source radiation information for each channel to the red, green, and blue values similar to those produced by conventional scanners for each spot on the film 110. These steps are required because the silver metal particles 134, 136,138 that form during the development process are not spectrally unique in each of the film layers 142, 144, 146. However, just as with conventional scanners, once initial red, green and blue values are derived for each image, further processing of the red, green, and blue values is usually done to produce images that more accurately reproduce the original scene and that are pleasing to the human eye.

The dye precursor may also be chosen such that the resulting dye formed during development will have certain spectral characteristics. For example, the dye may have known IR absorption properties which may be used to further distinguish the emulsion layers of the film from one another. By way of example, if a dye precursor is only incorporated into green-sensitive layer 144, the film may be scanned with IR light of two different wavelengths or broadband IR light. Sensors 31 may be configured such that a portion are responsive only to a selected wavelength of IR light (such as a wavelength at which the dye formed in the green-sensitive layer 144 exhibits an IR absorption peak). When sensors 31 are arranged in a plurality of linear arrays, one or more of the linear arrays may be sensitive to the selected IR wavelength and substantially unresponsive to other wavelengths of IR light used for scanning. In this manner, the DFP system of the present invention can distinguish between attenuation by elemental silver and attenuation by the dye.

Similarly, unique dye precursors may be incorporated into a plurality of the light sensitive layers of film 110, such that the dye formed in each layer has spectral characteristics which differ from those of the dyes formed in the other layers. For example, each of the three light-sensitive layers of film 110 may have a different dye precursor incorporated therein, with each precursor forming a dye which has an IR absorption peak at a unique wavelength. Film 110 can then be scanned with broadband IR light, and sensors 31 and 35 configured for selectively detecting certain wavelengths of IR light which correspond to the dye absorption peaks. In this manner, the data for each of the layers of film 110 can be distinguished from one another.

It is intended that the description of the present invention provided above is but one embodiment for implementing the invention. Variations in the description likely to be conceived of by those skilled in the art still fall within the breadth and scope of the disclosure of the present invention. While specific alternatives to steps of the invention have been described herein, additional alternatives not specifically disclosed but known in the art are intended to fall within the scope of the invention. Thus, it is understood that other applications of the present invention will be apparent to those skilled in the art upon the reading of the described embodiment and a consideration of the appended claims and drawings.

What is claimed is:

1. A method of developing a latent image on an exposed photographic element, comprising:
    (a) providing a photographic element comprising a light sensitive silver halide emulsion layer having a dye precursor incorporated therein;
    (b) applying a developer solution to said photographic element, thereby developing said latent image and forming said dye in said photographic element; and
    (c) scanning said photographic element with light while said latent image is developing, said light having a wavelength which is attenuated by said dye.

2. The method of claim 1, wherein said dye precursor comprises a coupler, said developer solution comprises a developing agent, said developing agent is oxidized upon development of said latent image, and said dye is imagewise formed in said photographic element by a reaction between said coupler and the oxidized developing agent.

3. The method of claim 1, wherein said developing agent comprises an aromatic primary amine.

4. The method of claim 1, wherein said light comprises infrared light.

5. The method of claim 1, wherein said photographic element comprises a plurality of light sensitive silver halide emulsion layers.

6. The method of claim 1, wherein said photographic element comprises a plurality of light sensitive silver halide emulsion layers having a dye precursor incorporated therein.

7. The method of claim 1, wherein said dye precursor comprises an infrared dye-forming coupler.

8. The method of claim 7, wherein said photographic element includes at least three silver halide emulsion layers, one responsive to the blue region of the spectrum, one responsive to the green region of the spectrum, and one responsive to the red region of the spectrum, and wherein said coupler is incorporated in the green responsive layer.

9. The method of claim 1, wherein said photographic element includes at least three silver halide emulsion layers, one responsive to the blue region of the spectrum, one responsive to the green region of the spectrum, and one responsive to the red region of the spectrum, and wherein a dye precursor capable of forming an infrared dye is incorporated in each of said layers.

10. The method of claim 9, wherein the same dye precursor is incorporated in each of said layers of the photographic element.

11. The method of claim 9, wherein different dye precursors are incorporated in each of said layers of the photographic element.

12. The method of claim 4, wherein said scanning step comprises scanning the photographic element with more than one wavelength of infrared light.

13. The method of claim 4, wherein said photographic element is scanned a plurality of times after application of the developer solution.

14. The method of claim 4, wherein said scanning step comprises applying infrared light to said photographic element and detecting light which is reflected from and transmitted through said photographic element.

* * * * *